Patented Apr. 26, 1949

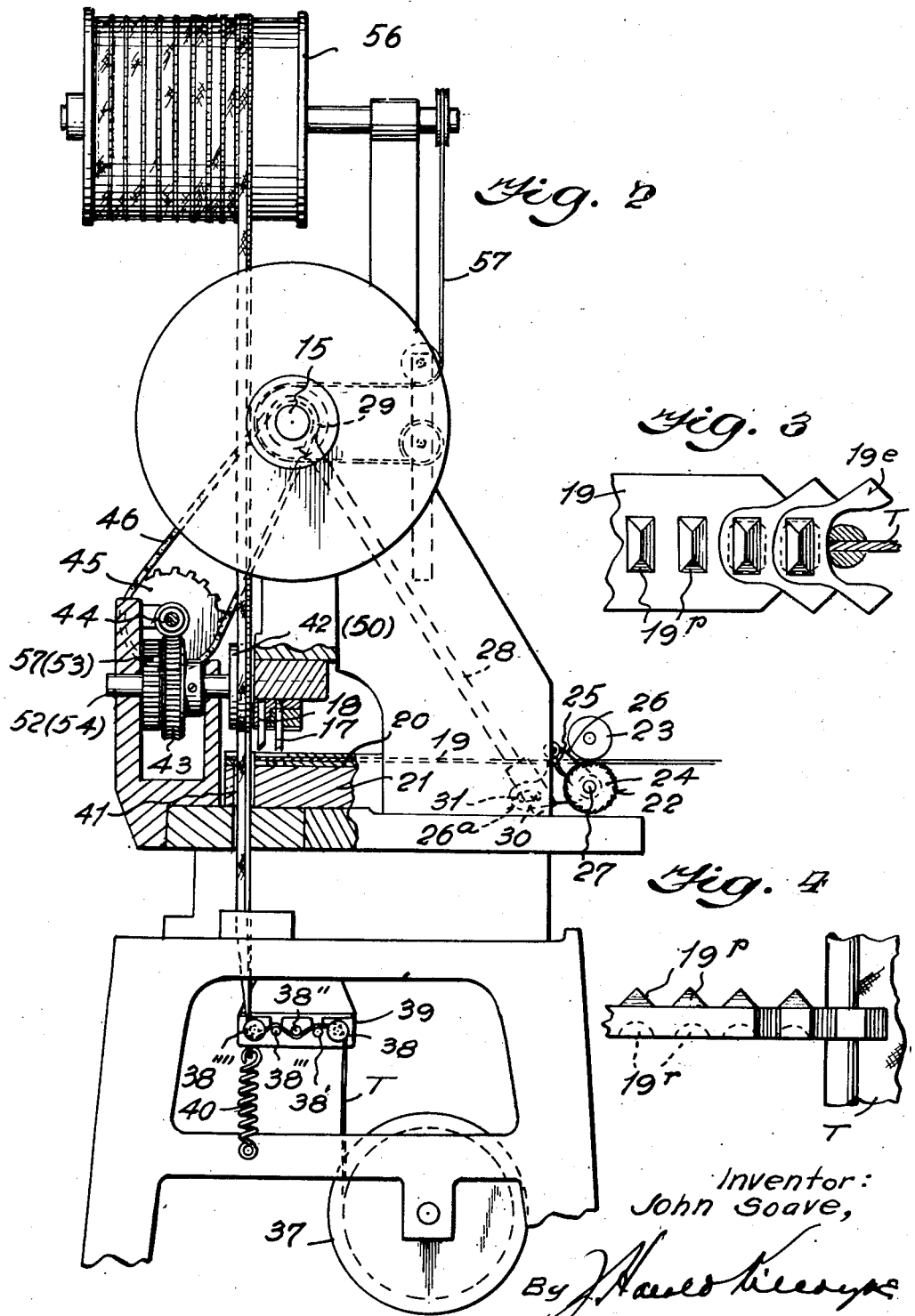

2,468,643

UNITED STATES PATENT OFFICE 2,468,643

APPARATUS FOR AND METHOD OF MANUFACTURING SLIDE FASTENERS

John Soave, Long Island City, N. Y., assignor to Waldes Koh-I-Noor, Inc., Long Island City, N. Y., a corporation of New York Application June 23, 1945, Serial No. 601,295

8 Claims. (Cl. 29—34)

This invention relates to improvements in apparatus for and method of manufacturing slide fasteners.

As is well known, slide fastener locking elements are usually formed with a head portion provided with a projection extending from one face thereof and a complemental recess in its other face which is adapted to receive the projection of an adjacent element, and with a pair of clamping jaws by which the elements are attached to the beaded edge of a flexible stringer or tape. According to a prior fastener manufacturing process, the locking elements are blanked from a flat strip of metal having substantially the same width as that of the elements with their clamping jaws spread, the head portion of one blank nesting in the space between the spread jaws of the next following element. In such method, the strip is advanced endwise with a step-by-step movement through a suitable die mechanism in which the head projections and recesses are formed and the headed element blanks severed from the strip. Thereupon, the feed motion of the strip advances the element blanks and presents them to the tape so positioned that their spread jaws are astride the tape head, the jaws being finally closed about the tape bead to effect their attachment to the tape. This known method also provides that the tape, like the strip and element blanks, is fed with a step-by-step motion timed with the feed of the metal strip and element blanks, with attachment of the elements, i. e. closing of their clamping jaws about the tape bead, being effected in the interval between two successive feed movements of the tape.

The aforesaid manufacturing process is open to certain objection and has not proved effective in practice. Not only was precise timing between element and tape feeds required but also the tape, due to its inherent elasticity, was stretched a certain amount by the sudden pull or jerk exerted on the tape to effect its step-by-step movement, with the tempo of the tape feed being hence limited by and made to depend largely upon the mechanical properties of the tape. If the tempo was increased beyond this limit, the process did not work smoothly and more to the point, the pitch distance between the elements, which must be fixed for smooth slider operation, becomes irregular.

In another prior fastener manufacturing process, the tape is continually pulled past the element-attaching or clamping station, but is given oscillating movement laterally of its direction of travel, thereby to permit the clamp tools to close on the clamping jaws of the elements. The result of the oscillating movement imparted to the tape is that it has non-uniform total movement even if the feed thereof is maintained constant. In apparatus and methods employing such a tape feed, precise timing is difficult because the tension of the tape is widely varied with its oscillating movement, which latter also limits the speed at which the apparatus can operate.

A principal object of the present invention is to overcome the noted disadvantages of the prior methods of slide fastener manufacture as above outlined and to provide instead an improved method of manufacturing slide fasteners, according to which the speed of the manufacturing process is substantially increased, while at the same time uniform pitch distance between elements upon their attachment to the tape is assured. More specifically, the invention proposes a novel method of manufacturing slide fasteners in which the step-by-step feed of the metal strip and element blanks to the tape is maintained but in which the tape, instead of being fed intermittently, as heretofore considered indispensible, is fed continuously in a fixed, straight-line path and at a uniform rate which can be precisely fixed with respect to the rate of element feed so as to insure proper spacing and pitch distance between elements upon their attachment to the tape.

It is a further aim of the invention to provide simple yet thoroughly dependable apparatus for carrying out the improved method as aforesaid, and more specifically to provide, in and for apparatus for the manufacture of slide fasteners, an effective yet simple means for continuously feeding the tape at a fixed uniform rate and by which the feed of the tape can be positively controlled.

Other objects will be in part obvious from the annexed drawing and in part hereinafter indicated in connection with the following analysis of the invention.

In the drawings—

Fig. 2 is a side elevation of the apparatus shown in Fig. 1, the die set and the adjoining parts being shown in the section; and Figs. 3 and 4 are diagrammatic views illustrating in plan and side elevation, respectively, the manner in which the element blanks are presented to a fastener tape.

Figure 1:
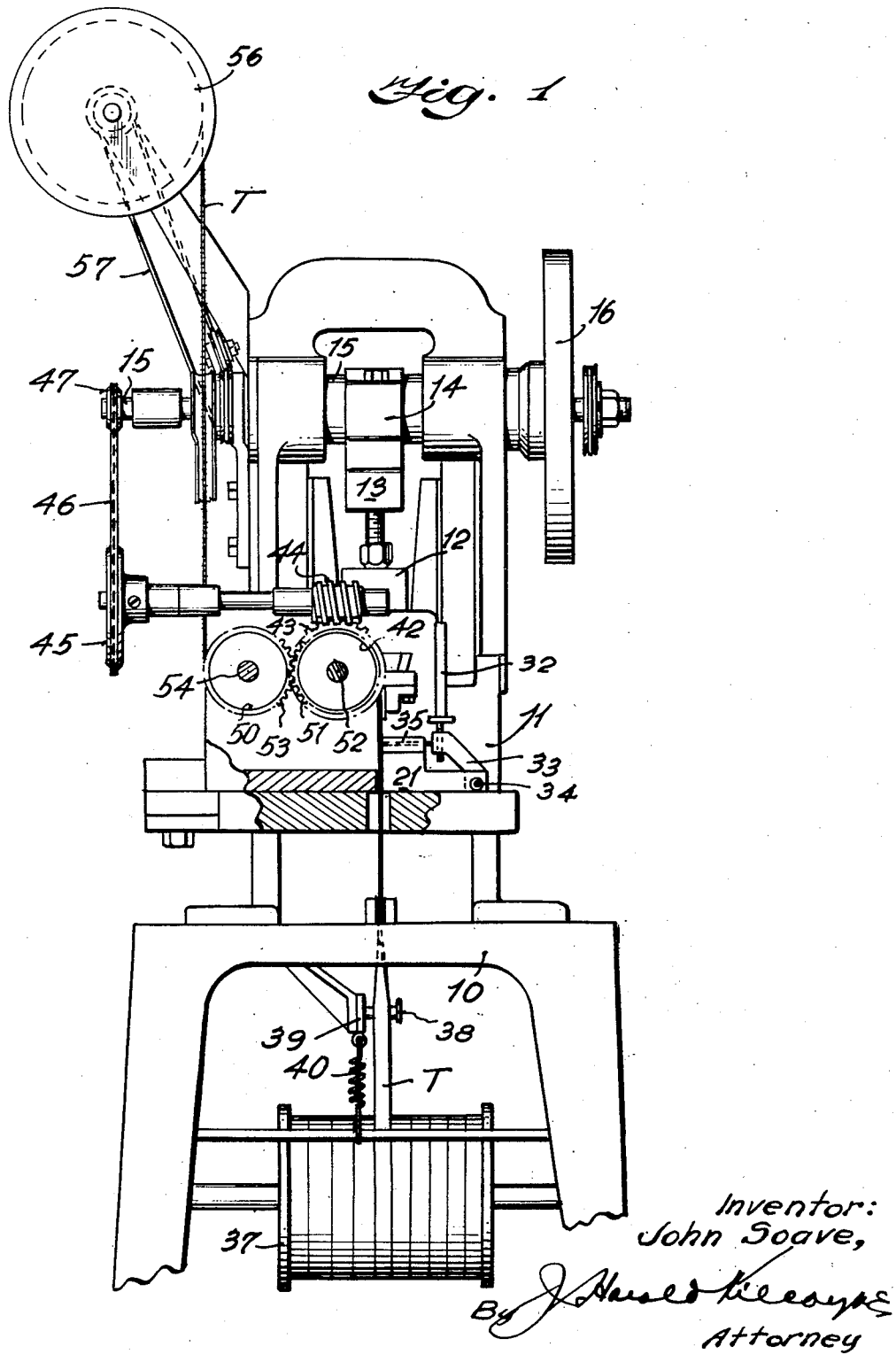
Fig. 1 is a front elevational view, partly in section, of apparatus for manufacturing slide fasteners according to the invention.

Referring more particularly to Figs. 1 and 2 of the drawings, reference character 10 indicates a stationary table or bed supporting an upright U-shaped frame 11 in which is mounted for reciprocation a press ram 12. The ram is driven in its up and down reciprocating movement through a connecting rod 13 from an eccentric 14 fast on the main drive shaft 15 of the machine, the latter carrying a driving pulley 16 or other appropriate driving means.

The ram 12 carries a punch set comprising a cupping punch 17 and a shearing punch 18. The cupping punch 17 engages a metal strip 19 fed to the punch set and, in cooperation with an appropriately shaped die plate 20 arranged on bolster plate 21 beneath the punch set, forms the projections 19p on the upper face and the recesses 19r on the under face of the strip 19 (Figs. 3 and 4). Shearing punch 18 cooperates with the die plate 20 to sever the elements 19e with their clamping jaws spread as shown from the blank 19 following the formation of the projections and recesses on the opposite faces thereof as described. The punch set 17, 18 is preferably detachably and interchangeably carried by the ram 12 as required for the manufacture of different sizes and shapes of elements.

The metal strip 19 is fed to the punch set with a step-by-step motion provided in the illustrated mechanism by two feed rollers 22, 23 (Fig. 2), the lower roller 22 being positively driven by a ratchet wheel 24 which is intermittently rotated by an oscillating pawl 25. The pawl is oscillated by a crank lever 26 which is rocked about the roller axis 27 by means of a connecting rod 28, which latter is reciprocated by an eccentric 29 carried by the drive shaft 15. Coupling between connecting rod 28 and crank lever 26 is effected by a pin 30 carried at the end of the rod 28 and operating in a slot 31 provided in arm 26a formed on the crank lever 26.

Connected with ram 12 for movement therewith in timed relation to the intermittent feed motion of the strip and element blanks are two push rods, of which only one, numbered 32, is shown in the drawings (Fig. 1). Push rod 32 in its downward movement pushes against a lever 33 pivoted to the machine bed by pin 34, and causes the lever to press against one end edge of a slide 35 to push this slide inwardly to a position such that its other end strikes one clamping jaw of a fastener element then astride the bead of the tape T. It will be understood that the other push rod (not shown) actuates a lever corresponding to lever 33 mounted at the other side of the machine to push a companion slide inwardly so that its operating end strikes against the other clamping jaw of the element astride the bead, with the conjoint action of the slides effecting closing of the clamping jaws on the tape, and hence firm attachment of the fastener element to the tape.

The apparatus so far described for effecting the step-by-step feed of the blank, the heading and severing of the elements therefrom, and the closing of the element clamping jaws on the tape in synchronism with the positioning of the elements astride the tape bead is of known construction, and no claim is made thereto except insofar as such apparatus is employed in the present invention in combination with the novel features to be described.

According to the invention, the fastener tape T, instead of being fed with the step-by-step motion of the prior practice, is advanced continuously in a fixed straight-line path and at a uniform rate of speed to the fastener elements being intermittently presented thereto as above described. To this end, the tape is unwound from a drum 37, on which it is conventionally coiled, under a constant tension which is necessary to attain exact pitch distance between the elements as they are attached to the tape. This constant tension is provided by a tape braking and tensioning device comprising a series of spaced rollers 38, 38', 38'', 38''', 38'''', which are carried by a frame 39 held under adjustable tension by a spring 40 anchored to the bed, the tape being threaded under and over the rollers of the series as shown.

From the braking and tensioning device, the tape is guided through a tape slot 41 in the bolster plate 21 of the die set to the main tape driving roll 42, which is rotated at a fixed speed by a worm gear 43 meshing with a worm 44 turning with a sprocket wheel 45, the latter being driven by chain 46 from sprocket 47 fast on the main drive shaft 15, generally as shown.

In order to obtain utmost uniformity of tape travel without tape slippage, a second tape driving roll 50 mounted adjacent the main drive roll 42 is driven at the same peripheral speed as the latter through gear 51 affixed to stub shaft 52 carrying the main driving roll 42 and an intermeshing gear 53 fast on a parallel stub shaft 54 which carries the second driving roll. As seen more particularly in Fig. 1, the tape is run over the main driving roll 42 and under the second driving roll 50 and hence has surface contact with the positively driven rollers for a substantial portion of its length. From the driving rolls, the tape is guided to a take-up drum 56 which is driven at the required rate of take-up by a drive chain 57 from the main shaft 15.

Due to the uniform tension applied to the tape by the braking and tensioning rollers 38, 38', 38'', 38''', in combination with the positive feed motion of the tape imparted by the two positively driven rolls 42 and 50 as described, the tape is fed continuously and at fixed and uniform rate which is predetermined in relation to the step-by-step feed motion of the elements being presented thereto so as to provide the desired pitch distance between the elements being attached to the tape. This even feed of the tape not only insures uniform pitch distance between the elements and smooth functioning of the machine but also makes possible a substantial speeding up of the manufacturing process. As an example of the latter, the speed of the manufacturing process according to the present invention can be doubled or even trebled, as compared with the prior process, in which the tape was fed with a step-by-step motion timed both with the step-by-step movement of the metal strip from which the elements are formed and with the reciprocatory motion of the ram and jaw closing levers.

The above described tape feeding means also provide a simple arrangement for controlling the rate of feed of the tape and for the speed of the manufacturing process. Thus by the simple expedient of varying the rate of motion of the drive shaft 15, the process may be speeded up or slowed down to meet a particular requirement, without being limited by the mechanical properties of the tape. The rate of tape feed in relation to the intermittent feed motion of the strip and element blanks may also be varied by a change of driving gear ratios as required to advance or retard the feed motion of the tape relative to that of the element blanks.

As many changes could be made in carrying out the above constructions without departing from the scope of the invention, it is intended that all matter contained in the above description or shown in the accompanying drawings shall be interpreted as illustrative and not in a limiting sense.

I claim:

1. Apparatus for the manufacture of slide fasteners comprising, in combination, means for forming a succession of fastener element blanks having clamping jaws disposed in spread relation from an intermittently moving metal strip, means for effecting movement of the blanks in succession responsively to the intermittent motion of the strip to an attaching position in which the clamping jaws are astride a fastener tape to which they are to be attached and which extends at right angles to the elements, means for effecting a continuous feed of the tape to and past the elements in a fixed, straight-line path and at a uniform rate which is predetermined in relation to the feed motion of the elements, and means operative in synchronism with the movement of each of the elements to the attaching position aforesaid to effect closing of its clamping jaws on the tape edge.

2. In the manufacture of slide fasteners, the method which comprises forming a succession of fastener elements having clamping jaws disposed in spread relation from an intermittently moving metal strip, feeding the elements in succession responsively to the intermittent motion of the strip to an attaching position in which their clamping jaws are astride an edge of a fastener tape disposed at right angles to the elements, feeding the tape continuously in a fixed, straight-line path and at a uniform rate to and past the elements being presented thereto, and closing the clamping jaws of the elements on the tape edge in synchronism with the positioning of each of the elements as aforesaid.

3. In the manufacture of slide fasteners, the method which comprises feeding a metal strip to a die mechanism with a step-by-step motion and wherein the element heads are formed and the elements with their clamping jaws disposed in spread relation are severed from the strip, feeding a succession of the severed elements with a step-by-step motion dependent on the feed motion of the strip to an attaching position in which their clamping jaws are astride an edge of the fastener tape, feeding the tape continuously in a fixed straight-line path and at a uniform rate to the elements being presented thereto as aforesaid, and closing the element jaws on the tape edge in synchronism with the positioning of each of the elements as aforesaid.

4. Apparatus for the manufacture of slide fasteners comprising, in combination, a die set including a cupping punch adapted to form the head projection and recess of the fastener elements and a shearing punch for severing the fastener element blanks from a strip with their clamping jaws disposed in spread relation, means for feeding a metal strip to said die set with a step-by-step motion, said means being operative through said strip to feed the element blanks upon their severance from the strip to an attaching position relative to the fastener tape in which the element clamping jaws are astride an edge of the tape, means for effecting a continuous feed of the tape to the elements in a fixed straight-line path and at a uniform rate which is predetermined in relation to the feed motion of the elements, and means operative in synchronism with the movement of each of the elements to the attaching position aforesaid to effect closing of the clamping jaws thereof on the tape edge.

5. Apparatus for the manufacture of slide fasteners as set forth in claim 4, wherein means are provided for maintaining the tape under a constant tension.

6. Apparatus for the manufacture of slide fasteners as set forth in claim 4, wherein the tape is fed from a drum, and wherein the tape feeding means effects unwinding of the tape from the drum under a constant adjustable tension.

7. Apparatus for the manufacture of slide fasteners as set forth in claim 4, wherein the tape feeding means comprising a take-off drum, and means for unwinding the tape from the take-off drum under constant adjustable tension, including a pair of adjacent tape feeding rolls positively driven at the same peripheral speed, the tape being run over one feeding roll and under the adjacent feeding roll.

8. In apparatus for attaching fastener element blanks having clamping jaws disposed in spread relation to a fastener tape and wherein a succession of element blanks is advanced with step-by-step motion to an attaching position relative to the tape, means for feeding the tape in a fixed straight-line path which extends between the clamping jaws of the elements when the latter are in their attaching position comprising a take-off drum, disposed to one side of said attaching position of the elements, a tape braking and tensioning device mounted adjacent the take-off drum for effecting unwinding of the tape therefrom under constant adjustable tension, a pair of similar tape feeding rolls operative to draw the tape from the take-off drum and being disposed to the other side of the attaching position of the elements and arranged so that the tape is run over one roll and under the other roll, and means for positively driving the feeding rolls at the same peripheral speed.

JOHN SOAVE.

REFERENCES CITED

The following references are of record in the file of this patent:

UNITED STATES PATENTS

| Number | Name | Date |
| --- | --- | --- |
| 1,888,254 | Amiet | Nov. 22, 1932 |
| 1,971,158 | Kiessling | Aug. 21, 1934 |
| 2,071,603 | Winterhalter | Feb. 23, 1937 |
| 2,141,200 | Sundback | Dec. 27, 1938 |
| 2,144,638 | Reiter | Jan. 24, 1939 |
| 2,148,673 | Arentzen | Feb. 28, 1939 |
| 2,231,286 | Firing | Feb. 11, 1941 |
| 2,261,552 | Koppel | Nov. 4, 1941 |
| 2,275,769 | Kiessling | Mar. 10, 1942 |
| 2,302,075 | Ulrich | Nov. 17, 1942 |

FOREIGN PATENTS

| Number | Country | Date |
| --- | --- | --- |
| 521,328 | Great Britain | May 17, 1940 |